(12) United States Patent
Sargent et al.

(10) Patent No.: US 9,780,967 B2
(45) Date of Patent: Oct. 3, 2017

(54) SYSTEM FOR PERFORMING VEHICLE DIAGNOSTIC AND PROGNOSTIC ANALYSIS

(71) Applicant: TELOGIS, INC., Aliso Viejo, CA (US)

(72) Inventors: Mark Sargent, Phoenix, AZ (US); Howard Jelinek, Laguna Beach, CA (US)

(73) Assignee: Telogis, Inc., Aliso Viejo, CA (US)

( * ) Notice: Subject to any disclaimer, the term of this patent is extended or adjusted under 35 U.S.C. 154(b) by 0 days.

(21) Appl. No.: 14/921,486

(22) Filed: Oct. 23, 2015

(65) Prior Publication Data
US 2016/0112216 A1 Apr. 21, 2016

Related U.S. Application Data

(63) Continuation-in-part of application No. 14/201,485, filed on Mar. 7, 2014, now Pat. No. 9,384,597.
(Continued)

(51) Int. Cl.
*H04L 12/66* (2006.01)
*H04L 29/08* (2006.01)
(Continued)

(52) U.S. Cl.
CPC .............. *H04L 12/66* (2013.01); *G07C 5/008* (2013.01); *G07C 5/0808* (2013.01);
(Continued)

(58) Field of Classification Search
CPC ..... H04L 67/12; H04L 2209/84; G07C 5/085; G07C 5/00; G07C 5/0808; G07C 5/02;
(Continued)

(56) References Cited

U.S. PATENT DOCUMENTS

| 5,809,437 A | 9/1998 | Breed |
| 6,154,658 A | 11/2000 | Caci |

(Continued)

FOREIGN PATENT DOCUMENTS

| EP | 1221588 A1 | 7/2002 |
| EP | 2790414 A1 | 10/2014 |

(Continued)

OTHER PUBLICATIONS

Hess et al., "Prognostics, from the Need to Reality—from the Fleet Users and PHM System Designer/ Developers Perspectives" IEEEAC Paper #116, Updated Jan. 15, 2002.
(Continued)

*Primary Examiner* — Melanie Jagannathan
*Assistant Examiner* — Najeebuddin Ansari

(57) ABSTRACT

A black-box gateway device implemented in a vehicle and configured to interface with an engine computer and a plurality of wireless sensors installed in the vehicle, the gateway device can include a transceiver including input ports in communication with conductors that interface with the engine computer installed in an engine of the vehicle, radio frequency communications components comprising dual wireless functionality, including a first functionality for communicating wirelessly within the vehicle and a second functionality for communicating wirelessly over a cellular network disposed outside the vehicle, and one or more antennae that receive wireless signals from the radio frequency components. The transceiver can be configured to wirelessly receive sensor data from the wireless sensors disposed within the vehicle, the sensor data providing information associated with functionality of components of the vehicle.

19 Claims, 7 Drawing Sheets

Related U.S. Application Data

(60) Provisional application No. 62/068,200, filed on Oct. 24, 2014, provisional application No. 61/785,068, filed on Mar. 14, 2013, provisional application No. 61/785,523, filed on Mar. 14, 2013.

(51) Int. Cl.
*G07C 5/00* (2006.01)
*G07C 5/08* (2006.01)

(52) U.S. Cl.
CPC ............ *G07C 5/0825* (2013.01); *H04L 67/12* (2013.01); *H04L 67/303* (2013.01)

(58) Field of Classification Search
CPC ...... G07C 5/0841; G07C 5/006; G06Q 10/20; G06Q 30/0645; G06Q 50/30; G06Q 30/012; B60R 16/023
USPC .............................. 340/933; 701/1, 2, 31–36
See application file for complete search history.

(56) References Cited

U.S. PATENT DOCUMENTS

| | | | |
|---|---|---|---|
| 6,263,268 B1 | 7/2001 | Nathanson | |
| 6,301,531 B1 | 10/2001 | Pierro et al. | |
| 6,429,773 B1 | 8/2002 | Schuyler | |
| 6,604,033 B1 | 8/2003 | Banet et al. | |
| 6,611,740 B2 | 8/2003 | Lowrey et al. | |
| 6,732,031 B1 | 5/2004 | Lowrey et al. | |
| 6,920,381 B2 | 7/2005 | Doherty et al. | |
| 7,123,164 B2 | 10/2006 | Zoladek et al. | |
| 7,155,321 B2 | 12/2006 | Bromley et al. | |
| 7,275,027 B2 | 9/2007 | Sproule | |
| 7,373,225 B1 | 5/2008 | Grier et al. | |
| 7,536,457 B2 | 5/2009 | Miller | |
| 7,659,827 B2 | 2/2010 | Gunderson et al. | |
| 7,804,426 B2 | 9/2010 | Etcheson | |
| 7,912,641 B2 | 3/2011 | Osentoski et al. | |
| 8,036,788 B2 | 10/2011 | Breed | |
| 8,086,368 B2 | 12/2011 | Petricoin, Jr. et al. | |
| 2002/0007225 A1 | 1/2002 | Costello et al. | |
| 2002/0123832 A1* | 9/2002 | Gotvall .................... G08G 1/20 701/36 | |
| 2003/0095038 A1* | 5/2003 | Dix ........................ G07C 5/008 340/425.5 | |
| 2004/0039502 A1* | 2/2004 | Wilson .................. G01D 9/005 701/32.7 | |
| 2005/0171661 A1 | 8/2005 | Abdel-Malek et al. | |
| 2006/0190162 A1 | 8/2006 | Ampunan et al. | |
| 2007/0257781 A1 | 11/2007 | Denson | |
| 2007/0257782 A1 | 11/2007 | Etcheson | |
| 2007/0257804 A1 | 11/2007 | Gunderson et al. | |
| 2007/0257815 A1 | 11/2007 | Gunderson et al. | |
| 2007/0260361 A1 | 11/2007 | Etcheson | |
| 2007/0260363 A1 | 11/2007 | Miller | |
| 2007/0268158 A1 | 11/2007 | Gunderson et al. | |
| 2007/0271014 A1* | 11/2007 | Breed ...................... B60J 10/00 701/31.9 | |
| 2007/0271105 A1 | 11/2007 | Gunderson et al. | |
| 2008/0043736 A1 | 2/2008 | Stanley | |
| 2008/0049830 A1 | 2/2008 | Richardson | |
| 2008/0114502 A1* | 5/2008 | Breed ..................... B60C 11/24 701/2 | |
| 2008/0147265 A1* | 6/2008 | Breed .................. G07C 5/0808 701/424 | |
| 2008/0161989 A1* | 7/2008 | Breed ...................... B60J 10/00 701/31.4 | |
| 2008/0269978 A1 | 10/2008 | Shirole et al. | |
| 2008/0294690 A1 | 11/2008 | McClellan et al. | |
| 2009/0051510 A1 | 2/2009 | Follmer et al. | |
| 2009/0089134 A1 | 4/2009 | Uyeki | |
| 2009/0112394 A1 | 4/2009 | Lepejian et al. | |
| 2009/0254240 A1* | 10/2009 | Olsen, III .............. G06Q 10/06 701/29.5 | |
| 2010/0057290 A1 | 3/2010 | Brillhart et al. | |
| 2010/0087984 A1 | 4/2010 | Joseph | |
| 2010/0161171 A1* | 6/2010 | Valentine ............... B22D 11/12 701/31.4 | |
| 2010/0174439 A1 | 7/2010 | Petricoin, Jr. et al. | |
| 2011/0046842 A1* | 2/2011 | Smith .................... G07C 5/006 701/31.4 | |
| 2011/0093159 A1 | 4/2011 | Boling et al. | |
| 2011/0196572 A1 | 8/2011 | Tsuchikiri et al. | |
| 2011/0225096 A1 | 9/2011 | Cho et al. | |
| 2011/0238258 A1 | 9/2011 | Singh et al. | |
| 2012/0089299 A1* | 4/2012 | Breed ..................... B60C 11/24 701/36 | |
| 2012/0100509 A1 | 4/2012 | Gunderson et al. | |
| 2012/0116609 A1 | 5/2012 | Jung et al. | |
| 2012/0116631 A1 | 5/2012 | Lee et al. | |
| 2013/0173028 A1 | 7/2013 | Felty et al. | |
| 2013/0204484 A1 | 8/2013 | Ricci | |
| 2013/0332023 A1 | 12/2013 | Bertosa et al. | |
| 2014/0052328 A1 | 2/2014 | Nguyen et al. | |
| 2014/0074345 A1 | 3/2014 | Gabay et al. | |
| 2014/0180536 A1* | 6/2014 | Nagata ................... B60K 35/00 701/36 | |
| 2014/0277902 A1 | 9/2014 | Koch | |
| 2014/0310186 A1* | 10/2014 | Ricci ..................... H04W 48/04 705/302 | |

FOREIGN PATENT DOCUMENTS

| | | |
|---|---|---|
| WO | WO 2009/114626 A2 | 9/2009 |
| WO | WO 2014/159127 A1 | 10/2014 |

OTHER PUBLICATIONS

International Search Report and Written Opinion issue in application No. PCT/US2014/022078 dated Jun. 25, 2014.
International Search Report and Written Opinion of the International Searching Authority issued in International Application No. PCT/US2015/057215, dated Jan. 27, 2016.

* cited by examiner

SYSTEM FOR PERFORMING VEHICLE DIAGNOSTIC AND PROGNOSTIC ANALYSIS

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Vehicle and fleet management systems generally strive to maintain fleet vehicles in good operating condition. Vehicles undergo scheduled maintenance and other vehicle services, such as tire rotations, oil changes, brake pad replacements, changing fluids, and other services. The maintenance services can help to prevent or reduce the likelihood of break downs or catastrophic failure to the vehicles, which can reduce downtime in operation of vehicles.

SUMMARY

The systems, methods, and devices of this disclosure each have several innovative aspects, no single one of which is solely responsible for the all of the desirable attributes disclosed herein.

In one embodiment, a black-box gateway device implemented in a vehicle and configured to interface with an engine computer and a plurality of wireless sensors installed in the vehicle. The gateway device can include a transceiver comprising input ports in communication with conductors that interface with the engine computer installed in an engine of the vehicle; radio frequency communications components comprising dual wireless functionality, including a first functionality for communicating wirelessly within the vehicle and a second functionality for communicating wirelessly over a cellular network disposed outside the vehicle; and one or more antennae that receive wireless signals from the radio frequency components. The transceiver can be configured to wirelessly receive sensor data from the wireless sensors disposed within the vehicle, the sensor data providing information associated with functionality of components of the vehicle. The gateway device can include digital logic circuitry programmed with executable instructions that configure the digital logic circuitry to identify one of the wireless sensors associated with the received sensor data; determine whether to transfer the sensor data over the cellular network to a remote vehicle management system based, at least in part, on a comparison of the sensor data to a threshold associated with the identified sensor; and based on a determination that the sensor data satisfies the threshold, transmit at least a portion of the data to a vehicle management system.

In some configurations, the identification of the sensor is based, at least in part, on header information received with the sensor data. In some configurations, the sensor data comprises at least one of a sensor identity, a location of the sensor, or a type of sensor data. In some configurations, the processor is further configured to determine whether to transfer the sensor data by comparing the received sensor data to previous sensor data. In some configurations, the digital logic circuitry is further configured to determine whether to transfer the sensor data to a vehicle management system based, at least in part, on a determination that a difference between the on a comparison between the received sensor data to the previous sensor data satisfies a change threshold. In some configurations, the digital logic circuitry is further configured to determine whether to transfer the sensor data to the vehicle management system based, at least in part, a defined period of time has elapsed since transmission of previous sensor data. In some configurations, the transceiver is configured to receive the sensor data at periodic intervals. In some configurations, the digital logic circuitry is further configured to filter the sensor data received from the sensor to remove entries where a designated portion of the sensor data is the same. In some configurations, the transceiver is configured to receive sensor data from a plurality of sensors disposed within the vehicle. In some configurations, the gateway module is configured to receive vehicle data from a vehicle bus and transmit at least a portion of the vehicle data to the vehicle management system. In some configurations, the vehicle bus Controller Area Network (CAN) bus.

In another embodiment, a computer system implemented in a vehicle and configured to interface with an engine computer and a plurality of wireless sensors installed in the vehicle. The computer system can include digital logic circuitry programmed with executable instructions that configure the digital logic circuitry to receive a plurality of transmissions comprising sensor data from a sensor disposed within a vehicle; filter the plurality of transmissions of sensor data to remove transmissions where at least a portion of the sensor data received from the plurality of transmissions is the same; compare the filtered sensor data to previous sensor data received from the sensor; and based on a determination that a difference between the sensor data and the previous sensor data exceeds a determined threshold associated with the sensor data, transmit at least a portion of the data to a vehicle management system.

In some configurations, the digital logic circuitry can be configured to receive the sensor data includes receiving a plurality of transmissions from the sensor comprising the same sensor data. In some configurations, the sensor data comprises identification information identifying the sensor within the vehicle. In some configurations, the digital logic circuitry can be configured to receive sensor data from a plurality of sensors disposed within the vehicle.

In another embodiment, a method for interfacing with an engine computer and a plurality of wireless sensors installed in a vehicle. The method can include receiving wirelessly, by a hub device, sensor data from a wireless sensor disposed within a vehicle, wherein the sensor data provides information associated with a component of the vehicle; filtering the plurality of transmissions of sensor data to remove transmissions where at least a portion of the sensor data received from the plurality of transmissions is the same; processing, by the hub device, the sensor data to determine whether to transfer the sensor data to a vehicle management system; and based on a determination to transfer the sensor data to the vehicle management system, transmitting at least a portion of the sensor data to the vehicle management system.

In some embodiments, the processing includes comparing the sensor data to previous sensor data to determine whether the previous sensor data is different from the sensor data. In some embodiments, receiving the sensor data includes receiving a plurality of transmissions from the sensor comprising the same sensor data. In some embodiments, processing includes filtering the plurality of sensor data received from the sensor to remove entries where a designated portion of the sensor data is the same. In some embodiments, the sensor data comprises identification information identifying the sensor within the vehicle.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

DETAILED DESCRIPTION

Advantageously, this disclosure describes embodiments of real-time vehicle diagnostic and prognostic analysis features that can be used to perform preventive diagnostic analysis of the engine and vehicle. This analysis can be used to identify potential problems within the vehicle and provide a recommended treatment or service before a failure occurs. Any of the systems and processes described herein can be performed in real time or near-real time.

Figure 1:
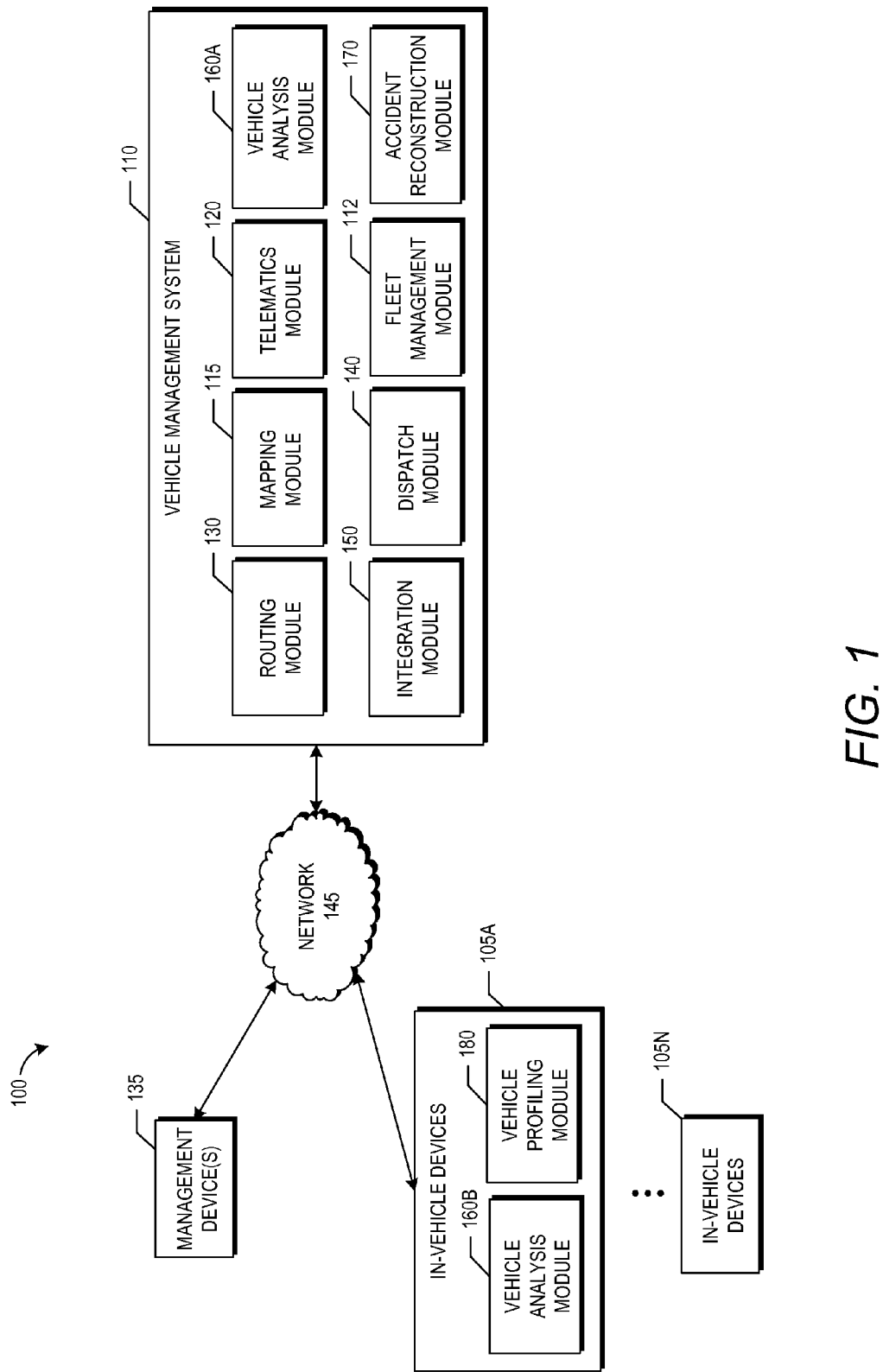
FIG. 1 illustrates an embodiment of a computing environment that includes an example vehicle management system.

FIG. 1 illustrates a computing environment 100 for implementing an example of a vehicle management system 110, which is further described below. The example vehicle management system 110 shown includes a vehicle analysis module 160 that can perform diagnostic and/or prognostic analysis of the engine and vehicle. The vehicle analysis module 160 can be implemented by one or more physical computing devices, examples of which are provided below. The vehicle analysis module 160 can perform onboard and/or offboard vehicle analysis and may be implemented in the system 110 (as offboard module 160A) and/or in the vehicles (as onboard module 160B). The onboard vehicle analysis module 160B optionally included in the vehicle can include one or more computers coupled to the vehicle computer. For example, in one embodiment the onboard vehicle analysis module 160B is a computing device or gateway device coupled to the vehicle computer through the OBDII port or CAN bus. The computing device can also be in communication with a radio device that transmits data from the computing device to the vehicle management system 110 or to other devices.

The vehicle analysis module 160A or 160B can collect and gather data and information about the engine from the vehicle computer and/or data from other sensors in or on the vehicle. The onboard vehicle analysis module 160B can communicate the collected vehicle data and information to the vehicle management system 110. In another embodiment, the onboard vehicle analysis module 160B filters or processes the data prior to sending the data to the vehicle management system 110. The onboard vehicle analysis module 160B can communicate some or all of the filtered data and information to the offboard vehicle analysis module 160A of the vehicle management system 110.

If the onboard vehicle analysis module 160B is unable to connect to a network or communicate with the vehicle management system 110, the onboard vehicle analysis module 160B can save and send the vehicle data when the onboard vehicle analysis module 160B is able to communicate with the server again. In some embodiments, the vehicle analysis module 160 can operatively couple with a mobile communication device located within the vehicle, such as a cell phone or other in-vehicle network capable electronic device. Vehicle diagnostic processes can be performed by the onboard vehicle analysis module 160B. The vehicle diagnostic processes can also be performed by the offboard vehicle analysis module 160A. In some embodiments, an initial analysis is performed by the onboard vehicle analysis module 160B and further analysis is performed by the offboard vehicle analysis module 160A.

The vehicle data collected by the onboard vehicle analysis module 160B can include vehicle condition information and engine data, such as vehicle year, make, model, engine/drive train, mileage, engine hours, start cycles, and other information related to vehicle condition. The vehicle data can also include check engine lights, fault codes, DTC codes, engine events, service intervals and other data collected from the engine computer. As mentioned above, the vehicle data collected by the onboard vehicle analysis module 160B can also include sensor data obtained from other sensors in the vehicle, such as tire pressure sensors, accelerometers, gyroscopes, temperature sensors, driver identification sensors (for example, that communicate with an ID badge of a driver via RFID or the like), combinations of the same, or the like.

The onboard vehicle analysis module 160B and the vehicle management system 110 can provide or analyze additional data that can be used for diagnostic analysis. For example, such data can include data provided by the manufacturer regarding diagnostic conditions, data obtained by crowd sourcing or otherwise analyzing data provided by a community of fleet vehicles (including, for example, predictive diagnoses based on community analysis of diagnostic trends), or the like.

The vehicle diagnostic functionality performed in the vehicle by the onboard vehicle analysis module 1606 or at the vehicle management system 110 by the offboard vehicle analysis module 160A can include, among other things, comparing collected vehicle data to a set of conditions in order to perform preventative diagnostic analysis of the vehicle before a failure occurs. For example, the vehicle analysis module 160A or 160B can analyze one or more fault codes in combination with data from the engine, such as mileage, engine hours, number of starter cycles, manufacturer data, or other data to determine whether an engine component should be replaced.

The vehicle analysis module 160A or 160B can further assess the severity or level of a predicted failure, such as whether it may be a catastrophic failure, a moderate failure, or other less serious failure. The vehicle analysis module 160A or 160B can also take into account the predictive cost of the effects of the failure in determining whether to recommend repair or replacement. For example, the vehicle analysis module 160A or 160B can determine whether the failure would strand a vehicle or driver, and if so, recommend urgent repair or replacement, while recommending less urgent repair or replacement for less catastrophic failures. Thus, the vehicle analysis module 160A or 160B can categorize diagnoses by the severity of predicted events, such as catastrophic events requiring immediate attention, major events requiring attention within specified number of days, minor events that can be evaluated at a next maintenance interval, and/or other categorizations. In one example, the vehicle analysis module 160A or 160B may determine that a starter engine should be replaced at the next scheduled service interval.

The offboard vehicle analysis module 160A can output the analysis and prognostic information obtained from the onboard vehicle analysis module 160B to a management device 135 operated by a fleet administrator or the like (which may be a mobile device), or any other device configured to receive notifications and updates from the offboard vehicle analysis module 160A. The output can include, for example, diagnostic codes or other diagnoses of vehicle problems, driver warnings, a list of proposed corrective actions, alarms, and/or other information provided by the onboard vehicle analysis module 160B to the system 110. Similarly, the onboard vehicle analysis module 160B can provide such outputs directly to the driver via an onboard computer (for example, on a display thereof) or a driver's computing device or phone. The outputs to the driver can include any of the outputs described above, as well as optionally navigation directions to dispatch the driver to a repair facility (for example, a nearest repair facility). The output could include a list of options of available service centers to perform the identified services, from which the driver can select and then be navigated to. Depending on the severity of the predicted failure, the outputs to the driver may, for more severe problems, provide rerouting to a nearest approved maintenance facility and navigate the driver to that location. For less severe problems, the outputs to the driver can indicate that maintenance should be performed soon or the like.

The output can also provide information and alerts to vehicle management system 110 or other fleet management personnel. The onboard vehicle analysis module 160B can analyze diagnostic data against one or more thresholds that are to be met prior to proceeding with changes to the vehicle route and/or recommending repairs. The thresholds can be machine-based and/or human-based thresholds. Machine-based thresholds could be determined by algorithms based on factors such as cost, time, energy usage, disruptive effect, and others. Human-based thresholds can include one or more approvals from the driver, vehicle maintenance personnel, management personnel, or others.

In some embodiments, the onboard vehicle analysis module 160B can filter data received from the engine computer and send a subset of the engine computer data (or other in-vehicle sensor data) to the offboard vehicle analysis module 160A. In some embodiments, the onboard vehicle analysis module 160B monitors the data received by the engine computer for changes. In one embodiment, when a change is detected, the updated data can be sent to the offboard vehicle analysis module 160A. For example, if the onboard vehicle analysis module 160B receives data from the engine computer continuously or substantially continuously, the onboard vehicle analysis module 160B may solely send data that was different from a previous set of data to the offboard vehicle analysis module 160A to conserve bandwidth. In another embodiment, the onboard vehicle analysis module 160B sends data periodically, such as once every hour or once every few hours, or even once a day or at longer intervals for measured parameters that change slowly.

Tire pressure data is an example of data that generally changes slowly. Instead of reporting tire pressure data to the vehicle management system 110 continuously or at frequent intervals (such as every 1 to 2 minutes), the onboard vehicle analysis module 160B can instead send updated tire pressure data to the vehicle management system 110 once per hour or couple of hours, once per day, or less frequently. In another embodiment, the onboard vehicle analysis module 160B sends updated tire pressure data to the vehicle management system 110 solely when the tire pressure changes more than a threshold amount. In another embodiment, the onboard vehicle analysis module 160B increases a frequency of transmission of sensor or engine data when the data changes more than a threshold amount. More generally, the onboard vehicle analysis module 160B can reduce, compress, or otherwise filter the diagnostic data sent to the vehicle management system 110.

Another example of data that the onboard vehicle analysis module 160B can filter or otherwise process is audio data. A vehicle may be equipped with microphones that record engine sounds or other vehicle sounds. While such sounds could be sent by the onboard vehicle analysis module 160B to the vehicle management system 110 for diagnostic analysis, transmission of raw or even compressed audio could consume significant bandwidth. To avoid this problem, the onboard vehicle analysis module 160B can perform a diagnostic analysis of the audio instead. For example, the onboard vehicle analysis module 160B might detect a particular type of engine problem from the audio data, such as engine knocking. The onboard vehicle analysis module 160B could then report a representation of this detected problem to the vehicle management system 110 instead of providing the audio files themselves, for example, by transmitting a message such as "engine knocking detected" or the like. In another embodiment, the onboard vehicle analysis module 160B transmits snippets or portions of the audio corresponding to the detected problem in addition to or instead of transmitting a representation of the detected problem. In response to detecting engine knocking, for instance, the onboard vehicle analysis module 160B can send a snippet of audio (such as a few seconds, or a few minutes, etc.) that correspond to the engine knocking sound to the vehicle management system 110. By sending a snippet of audio when a problem is detected, rather than a continuous or substantially continuous stream of audio, the onboard vehicle analysis module 160B can save bandwidth. Similar functionality can be performed for video data, as will be described below.

Figure 2:
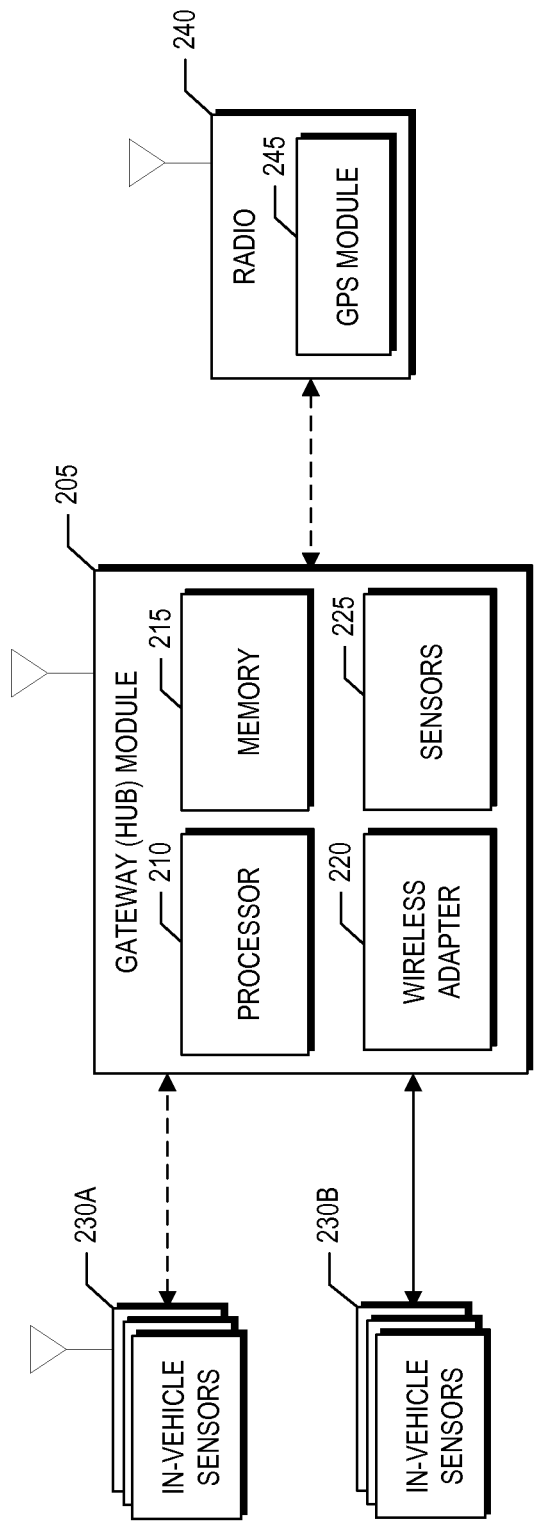
FIG. 2 illustrates as embodiment of a gateway module.

FIG. 2 illustrates an embodiment of a gateway module 205, also referred to as a gateway device or a vehicle hub. The gateway module 205 is an embodiment of an in-vehicle device 105A described above with reference to FIG. 1. The gateway module 205 can be a vehicle based data acquisition and transmission system. In the depicted embodiment, the gateway module 205 includes a processor 210, memory 215, a wireless adapter 220, and one or more sensors 225. The sensors 225 can measure vehicle data, such as vehicle position, temperature, time, acceleration, audio, and direction. In some embodiments, the sensors 225 can be omitted.

The gateway module 205 can be in communication with a radio transceiver 240 via a wireless or a wired connection (for example, with a serial cable or the like). The radio transceiver 240 can include a GPS module 245. The GPS module 245 can detect vehicle position. In some embodiments, the radio transceiver 240 and/or GPS module 245 can be incorporated into the gateway module 205.

The radio transceiver 240 can communicate with the vehicle management system 110 using various generation cellular air interface protocols (including, but not limited to, air interface protocols based on code division multiplex access (CDMA), time division multiple access (UEMA), global system for mobile communications (GSM), wireband code division multiplex access (WCDMA), code division multiplex access 3rd generation (CDMA2000), time division synchronous code division multiple access (UE SCDMA), wavelength and time division multiple access (WUEMA), long term evolution (LTE), orthogonal frequency division multiple access (OFDMA), and similar technologies). The radio 240 can also communicate with the vehicle management system 110 using TCP/IP protocols and using various communication protocols including, but not limited to, the family of IEEE 802.11 technical standards ("WiFi"), the IEEE 802.16 standards ("WiMax"), short message service ("SMS"), and voice over IP ("VoIP").

The radio transceiver 240 can transmit data received from the gateway module 205 to the vehicle management system 110. The radio transceiver 240 can communicate vehicle positioning data received from the GPS module 245 to the vehicle management system 110. The radio transceiver 240 can communicate frequently with the vehicle management system 110. In some instances, the radio 240 can keep the connection to the vehicle management system open, which can guarantee or attempt to guarantee data reliability. The radio transceiver 240 can transmit data periodically, and/or on an as-needed basis with the vehicle management system 110. In one embodiment, the radio transceiver 240 is a mobile phone and communicates with the vehicle management system 110 by placing a cellular phone call to a server of the vehicle management system 110.

The gateway module 205 can include sensors 225. The sensors 225 can be used to monitor operation of the vehicle. The incorporation of sensors 225 within the gateway module can enable vehicle data to be gathered from the sensors 225 without adding additional wires or optical connections to the vehicle. One example of a sensor 225 that may be included in the gateway module 205 is an accelerometer. An accelerometer can be used to detect hard braking, cornering and acceleration. In some instances, the accelerometer data can be used to update vehicle position data without using GPS data or triangulation technology. For example, the accelerometer can provide for short-term vehicle position reporting that operates without resorting to GPS signals. The gateway module 205 can offer a low cost longitude, latitude capability and combined hard braking sensor for vehicle history applications, such as the vehicle history systems and methods described in U.S. application Ser. No. 13/251,129, titled "History Timeline Display for Vehicle Fleet Management," filed Sep. 30, 2011, the disclosure of which is hereby incorporated by reference in its entirety.

Any number of in-vehicle sensors 230 can be located within the vehicle and can communicate with the gateway module 205. The in-vehicle sensors 230 can be located throughout the vehicle, including, for example, in the engine, tires, vehicle body, trailer, cargo areas, and other locations on and within the vehicle. Some examples of vehicle sensors include engine oil sensors, fuel level sensors, light sensors, door sensors, ignition sensors, temperature sensors (including in-cab and in-trailer), and tire pressure sensors. The sensors can provide different types of data, such as pressure data, temperature data, video data. Some sensors may be configured to detect binary events, such as the condition of a door, the door can be open or closed. The sensors can be used to monitor features associated with the safety and security of the vehicle and the occupants of the vehicle. Generally, the sensors can be wireless sensors 230A or wired sensors 230B.

At least some of the in-vehicle sensors 230 can communicate with the engine computer or other engine hardware configured to receive and process the data. The in-vehicle sensors can be located remotely and can transmit data wirelessly to the engine computer, the gateway module 205, and/or other data processing hardware. For example, a tire pressure sensor could wirelessly transmit tire pressure data to the gateway module 205 for processing.

At least some sensors 230 can communicate with the gateway module 205. Some sensors can be used that are provided by third party manufacturers. Thus, the sensors may be aftermarket sensors installed on or in the vehicle after manufacture of the vehicle or may be sensors that are installed with the vehicle at manufacture. The sensors 230 can include wireless adapters for communicating with the gateway module 205. In some embodiments, the sensors include a wireless transmitter and do not include a wireless receiver. Thus, the sensors may be mere transmitters or may instead be transceivers. Some sensors can broadcast data within a specified vicinity of the sensor, which can be received by the gateway module. The sensors can be powered by a power source independent of the vehicle, such as a battery. Some sensors can use long-life batteries such as lithium-ion batteries that can, in some instances, operate for years without replacement. The sensors 230 can include identification information that can be used by the gateway module 205 for identification of the sensor 230. In one embodiment, the identification information can be a 12-bit (or other length) address associated with the sensor. The sensor identification information can also include additional information such as the type of sensor, the location of the sensor, and other information associated with the sensor. In some embodiments, the gateway device 205 can use the identification information to form a pairing with the sensor, for example, by reading the identification information in a header of a packet transmitted wirelessly by each sensor to the gateway device 205.

The sensor 230 can be installed in or on the vehicle, and operation can be initiated. In some embodiments, the sensor can include a switch or input device that, when activated by a user, initiates operation of the sensor. After the sensor 230 has been made operational, the sensor 230 can continue to function until the sensor 230 runs out of power. Some sensors 230 can transition between an active mode and a sleep mode. In the active mode, the sensor 230 can resume normal operation, such as collecting and transmitting sensor data. In the sleep mode, the sensor 230 can suspend operation. The sensor 230 can operate in active mode when the vehicle is in operation. When the vehicle is not in operation, the sensor 230 can transition to sleep mode. Some sensors 230 can receive a signal from the gateway module 230, the engine computer, and/or another source that instructs the sensor to transition between active and sleep modes of operation.

Some sensors 230 can independently transition between active and sleep modes without receiving a signal from a source external to the sensor 230. In one embodiment, the sensors 230 can include an accelerometer. The data from the accelerometer can be used to determine when the vehicle is operational and trigger the sensor 230 to transition from sleep mode to active mode. The sensor 230 can use the data from the accelerometer to determine when the vehicle is no longer operating in order to transition from active mode to sleep mode. The sensor 230 may transition after no movement of the vehicle is detected for a determined amount of time. For example, if the accelerometer within or attached to the sensor detects no movement for 10 minutes, the sensor 230 can transition to sleep mode. In this manner, the sensor 230 can conserve battery life and independently control operational states of the sensor without management by the gateway module, the engine computer or other management component in the vehicle.

The gateway module 205 can be in communication with some or all of the in-vehicle sensors 230. For example, the gateway module 205 can be coupled to an OBDII or CAN bus in the vehicle to thereby receive in-vehicle sensor information from the engine computer. In some embodiments, one or more in-vehicle sensors can be directly coupled to the gateway module 205, or the gateway module 205 can communicate wirelessly with the in-vehicle sensors. For example, the gateway module could receive cargo bay temperature data from a temperature sensor wirelessly transmitting the data. The wireless sensors can use point-to-point transmission using wireless transmission standards such as Bluetooth or Zigbee.

In some embodiments, the gateway module 205 identifies sensors that are operating within a vehicle. Some sensors can broadcast sensor data, which can be received and processed by the gateway module 205. The gateway module 205 can have a configuration mode for identifying sensors 230 that are broadcasting sensor data. In the configuration mode, the gateway module 205 can identify sensors that are broadcasting sensor data associated with the vehicle. The gateway module 205 can use identification information stored in the sensor data to pair the sensor with the gateway module 205. Sensor data received from sensors that have been paired with the gateway module can be processed by the gateway module. Sensor data associated with sensors that have not been paired with the gateway module 205 can be disregarded. For example, in a parking lot, sensors from different vehicles may broadcast sensor data that is received by the gateway module. Thus, in one embodiment, only the sensors that have been previously identified during the configuration mode will be processed by the gateway 205 that has paired with those sensors.

In some embodiments, the gateway module 205 can process all types of sensor data and does not undergo a pairing process. The gateway module 205 sensor data can receive and process the sensor data without previously identifying or pairing with the sensor.

In some embodiments, the gateway module 205 can receive communications from the sensors 240 using a lightweight communication protocol. The communication protocol can be configured so that the sensor 230 can transmit information to the gateway module 205 without requiring a handshake or acknowledgment. The communication protocol can use various techniques to ensure or attempt to ensure the transmission of uncorrupt data from the sensor 230 to the gateway module 205. The sensors can communicate on Industrial, Scientific, and Medical (ISM) bands using, for example, ISM protocols. The sensors 230 can communicate using different frequencies from each other in order to help reduce collisions between packets at the gateway device 205 and to help ensure that the sensor data is received at the gateway module 205 intact. The sensors 230 (or the gateway device 205) may employ error correction coding techniques, such as Reed Solomon coding or checksums to ensure or attempt to ensure that packets are properly sent or received at the gateway device 205.

The sensors 340 can transmit data at low frequency. For example, the sensors can transmit data on a periodic basis (for example, every minute, every few seconds, or some other interval), on an event basis (for example, when data changes), on a pseudo-random or random basis or a combination of different methods. The sensors can transmit the same sensor data multiple times with an interval between each transmission. The interval between the transmissions can be constant or can vary. Sending the same data more than once can help ensure that uncorrupted data is received by the gateway module 205. For example, a sensor 230 can send data three times in a row to the gateway module 205. The intervals between each transmission can be a determined amount of time or at pseudo-random intervals. Even if one of the transmissions of data is corrupted, there is a low likelihood that each of the each of the plurality of transmissions will be corrupted.

The sensor data can be transmitted in a determined format, including a header and payload. In some embodiments, the sensor data includes a small amount of information, such as less than 100 bytes of information or even a few bytes in each packet. The header can identify the sensor, location of the sensor, type of sensor data and other information associated with the measurement. Some sensors may transmit multiple types of data, the header can identify the type of data that being transmitted by the sensor. Other information can also be included, such as sensor status information. The sensor status information can identify the operational mode, such as active or sleep mode, low battery, or other types of status information that is unrelated to the data being monitored by the sensor. In some instances, some or all of the data can be included in the header. The payload can include the data associated with the sensor 230, such as video data, temperature data, pressure data, etc. The gateway module can format and process prior to transmitting the data to the vehicle management server. For example the gateway module can covert the received data to a data format that is compatible with the transmission format used to transmit the data to the vehicle management system via the radio transceiver.

The processor 210 and memory 215 of the gateway module 205 can implement various features. Among others, the processor 210 of the gateway module 205 can perform the operations associated with the vehicle analysis module 160 and the vehicle profiling module 180 described above. The gateway module 205 can act as an intermediary processing platform for the vehicle management system 110. The gateway module 205 can process the data received from the in-vehicle sensors 230 and send a subset of the total data collected to the vehicle management system 110. The gateway module 205 can collect hundreds or thousands or more data points from sensors 225, in-vehicle sensors 230, and the engine computer. The gateway module 205 can, among other things, analyze, categorize, compress, or otherwise process the data before transmitting it to the vehicle management system 110. By preprocessing the data prior to sending the information to the vehicle management system 110, the gateway module 205 can determine what data to send to the vehicle management system 110, which can reduce redundant processing and bandwidth used to continually transmit vehicle data.

The gateway module 205 can monitor several vehicle characteristics. The sensors 225, 230 can provide information to the gateway module 205 at a specific frequency for each vehicle characteristic; however, the sensors 225, 230 may generally be recording data at a faster rate than the monitored vehicle characteristic is changing. As such, sending all of the data to the vehicle management system 110 every time a sensor provides data can waste bandwidth and provide redundant data points for the vehicle management system 110 to process. Advantageously, in certain embodiments, instead of sending all of this data to the vehicle management system 110, the gateway module 205 processes the data and selectively updates the vehicle management system 110. The gateway module 205 can also compress the data that is received. The gateway module 205 can selectively compress portions of the data using wavelet transforms or other compression techniques, including any lossy or lossless compression techniques. For example, the data relating to vehicle characteristics that are slowly changing can be compressed.

The gateway module 205 can process vehicle characteristics according to the rate at which the characteristics change. For example, engine characteristics can range from relatively slower changing characteristics, such as tire pressure or average fuel consumption, to relatively faster changing characteristics, such as engine RPM and speed. The gateway module 205 can provide updates to the vehicle management system 110 using different update approaches for each vehicle characteristic, including periodic updates, threshold-based updates, event-based updates, user-specified updates, and/or a combination of methods.

Periodic updates can provide updates to the vehicle management system at a specified frequency. For example, the gateway module 205 may update the remaining vehicle fuel data every 5 minutes. Threshold based updates can provide updates when the value of the vehicle characteristic meets or exceeds a specified threshold. The thresholds can be static, determined dynamically by the system, user specified, or determined using any other method. The thresholds can be absolute, such as a specific value, or relative, such as a percentage based change a specific number of units. For example, tire pressure data could be updated when the tire pressure changes by 10%, or when it changes by 2 psi, or if pressure drops below 35 psi. Event-based updates can prompt updates after a specific event occurs. For example, an update of all the vehicle characteristics may be provided when the engine starts or when an engine error is detected.

The gateway module 205 can use a combination of methods or algorithms to determine the frequency of the updates to the vehicle management system 110. For example, the tire pressure data could have a periodic update and a threshold based update. The tire pressure data could be updated every 30 minutes. However if there was a blowout, it can be beneficial to have a more rapid or immediate update to the tire pressure. As such, the gateway module 205 could evaluate the tire pressure against a threshold that updates tire pressure when a change is detected. The gateway module 205 can provide update routines that are dependent on the operational phase of the vehicle, such as warm-up operation versus normal operation. As engine conditions stabilize after warm-up the gateway module 205 can increase the intervals at which updates are provided to the vehicle management system 110. In some embodiments the gateway module 205 can send the updated data to the vehicle management system 205 and the raw data. The raw vehicle data can include some or all of the data that the gateway module 205 receives from the sensors and vehicle computer. The raw data can be transmitted with or without the preprocessed updated vehicle data.

More generally, in certain embodiments, the gateway module 205 can be a system that performs wired and/or wireless data acquisition within a vehicle. The gateway module 205 can pool data from various sensors, apply time stamps to the data, reformat the data, encode the data, and/or encrypt the data. Software running on the gateway module 205 can manage data acquisition and data formatting. The gateway module 205 can therefore acquire diagnostic bus and motor vehicle status data and buffer the data and forward the data directly to the vehicle management system or another in-vehicle device (such as a driver's cell phone, tablet, or laptop) via WiFi, Ethernet, RS232/422, USB or other suitable physical and wireless interfaces.

In some embodiments, the gateway module 205 can monitor the identification of the driver by using some type of identification module. The vehicle may include a biometric scanner that the driver uses prior to operating the vehicle. The data from the biometric scanner can be used to identify the driver. The driver can have a transmitter that identifies the driver and can communicate with the gateway module 205. The driver identification information can be associated with the other vehicle information that is transmitted to the vehicle management system 100. For example, all of the data transmitted can be associated with the specific driver ID. The data received by the vehicle management system can also include vehicle asset identification information provided by the gateway module 205. The vehicle asset identification information can be used to uniquely identify the vehicle to the vehicle management system 110.

Interception of Data from Vehicle Bus

Various systems and components have been described herein for acquiring GPS data, diagnostic bus data, tire pressure, and other sensor data. Data from the diagnostic bus can be acquired by connecting a cable to the diagnostic bus connector and the other end of the cable to an interface and then directly to a microcontroller in the interface. The data can then be processed and converted for transmitting and receiving signals on a serial bus. However, various embodiments described herein eliminate the cable and decouple or isolate the bus from other units to which it may be connected. For example, a diagnostic analyzer may be connected directly to the diagnostic connector whose signal pins are referenced to the vehicle electrical system. An example wireless module that can be connected to the vehicle bus is described below with respect to FIG. 3.

Figure 3:
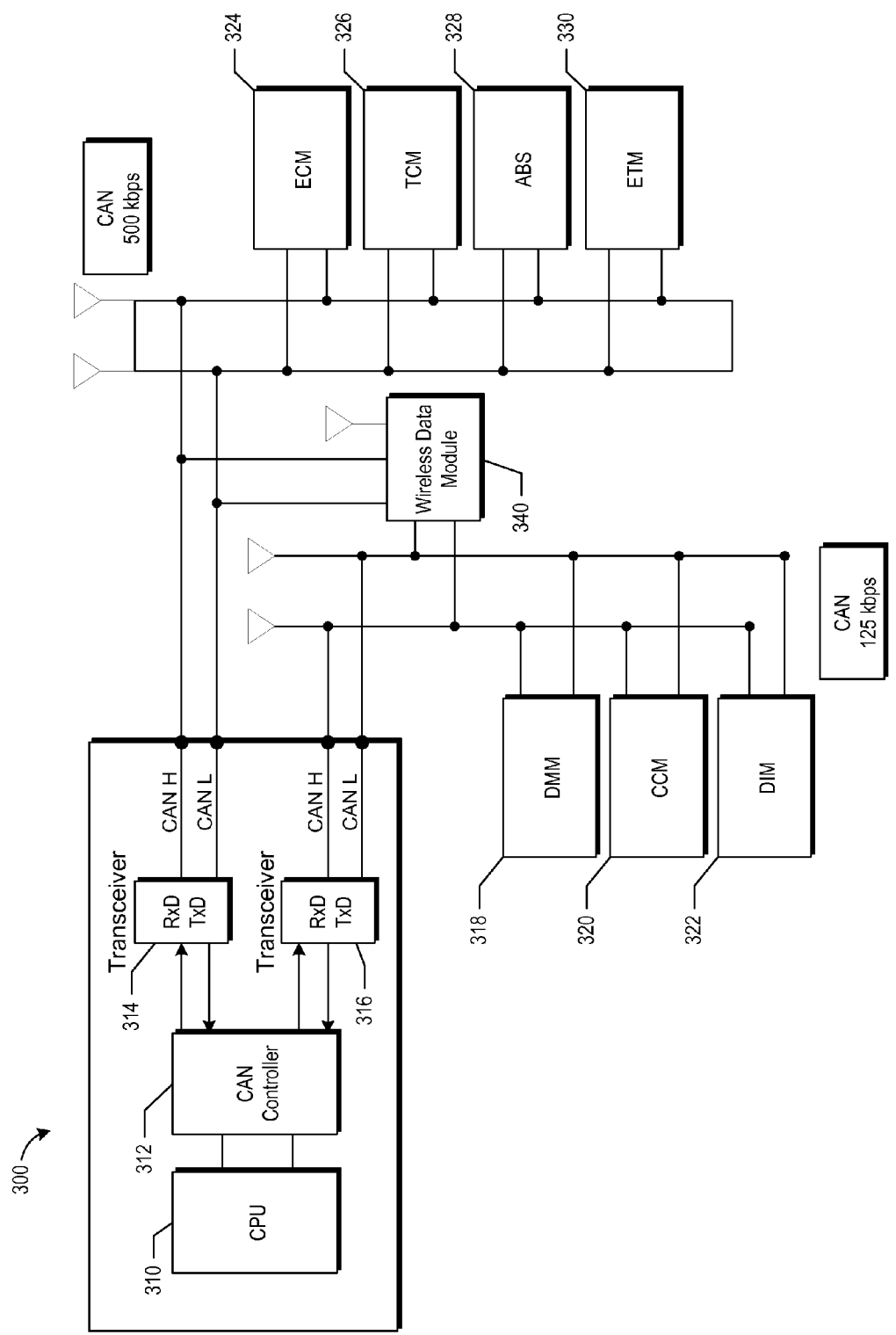
FIG. 3 illustrates an embodiment of an operating environment for a Controller Area Network (CAN) bus.

FIG. 3 illustrates an embodiment of an operating environment 300 for a Controller Area Network (CAN) bus. The CAN bus has a 125 kbps data bus 316 and a 500 kbps data rate bus 314 serviced by a CAN controller 312. The CAN controller 312 is operatively coupled to a CPU 310. A plurality of modules are connected through the buses 314, 316 to the CAN controller 312, including a door main module 318, a climate control module 320, a driver information module 322, an engine control module 324, a transmission control module 326, an antilock brake system 328, and an electronic control module 330. Other modules may be included in some embodiments, and fewer than all modules shown may be included in other embodiments.

A wireless data module 340 is shown, which can include a transmitter, a buffer, and a differential data to wireless converter. Alternatively, the wireless data module 340 includes a transmitter. The wireless data module 340 can monitor data on the CAN bus and convert the differential digital data to data that can be transmitted wirelessly. Thus, the wireless data module 340 can act as a serial data sniffer or packet sniffer that intercepts or otherwise obtains data from the bus and transmits the data to another device, such as the gateway module 205. The wireless data module 340 can level-translate serial data to be compatible with the gateway module 205 and/or packet networks. The wireless data module 340 can convert serial data into packets and transmit these packets to the gateway module 205. The wireless data module 340 can be attached to any CAN bus and provide real-time data transmission from the bus. The wireless data module 340 can operate in an interrupt mode, sending data to the gateway module 205 and activating an interrupt at the gateway module 205, or the gateway module 205 can poll the wireless data module 340. Advantageously, in certain embodiments, using the wireless data module 340 to intercept packets or other transmissions on the bus can allow the gateway device 205 to be placed anywhere in the vehicle, so long as the gateway device 205 is able to receive data from the wireless data module 340.

The protocols used for different applications and by different manufacturers can allow for multi module operation on a single bus. While the CAN bus electrical interface is the prevailing standard, other interface and protocol standards have been adopted by standards committees and manufacturers. These protocols include: J1962; ISO 9141; ISO 14230; ISO 15765-4; SAE J 1939; SAE J1850. These are open standards with prescribed electrical (transceiver) operation and defined protocols.

The wireless data module 340 can recognize states on the wired bus, including: neutral, HI (+,−) and LO (−,+). The wireless data module 340 can provide a wireless transmission code for each of the states. In one embodiment the transmission code methodology can be HI is a '1' bit; LO is a '0' bit, and neutral is marking (no transmission). The wireless data module 340 can be a transmitter or a transceiver that operates with half or full duplex operation in some embodiments. The wireless data module 340 can also use the industrial, scientific, and medical (ISM) radio band to communicate with the gateway module 205, which may have a corresponding ISM band transceiver.

The wireless data module 340 can generally communicate with other devices located in-vehicle and within a transmission distance of 15 meters. The power levels can be relatively low. The wireless data module 340 can transmit data to the gateway module 205.

Figure 4:
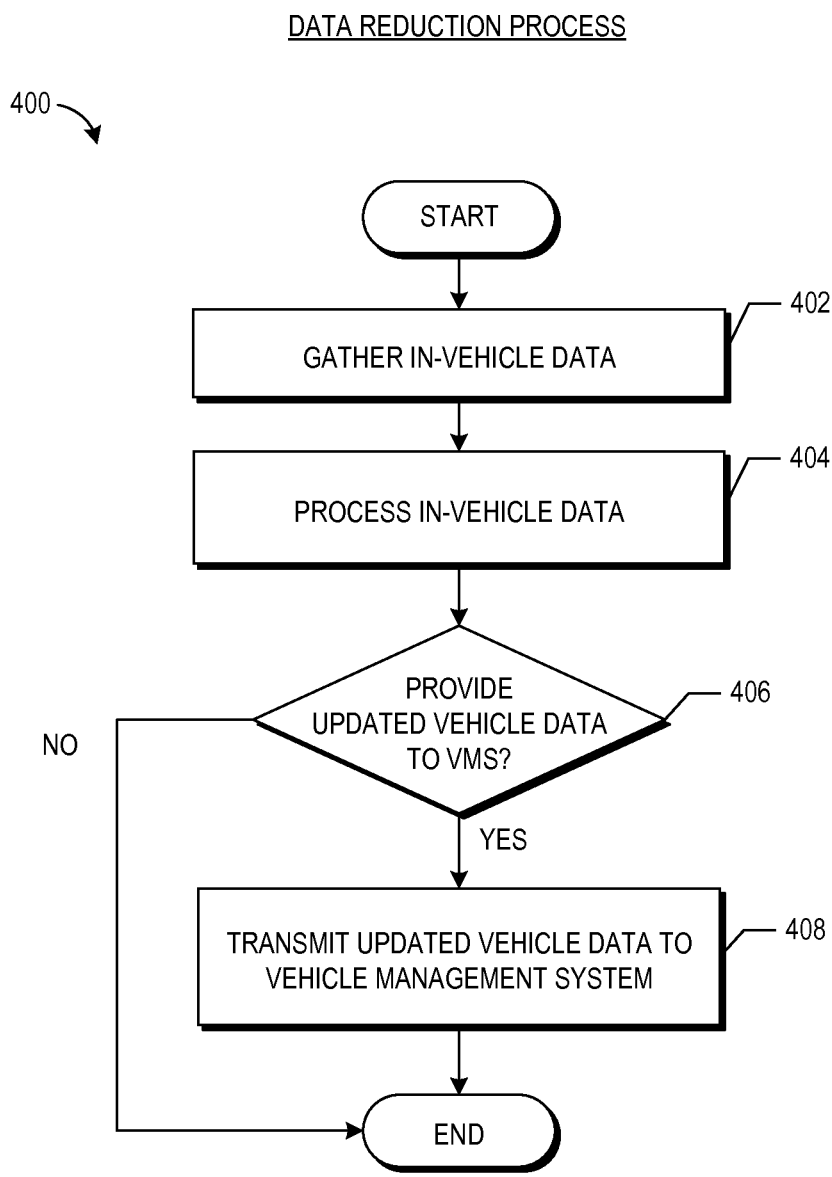
FIG. 4 illustrates a flowchart of an embodiment of a data filtering process.

FIG. 4 depicts an example data reduction process 400 for processing in-vehicle data prior to sending in-vehicle data to a vehicle management system. The data reduction process 400 may be implemented by one or more computing devices/components, such as any of the computing devices associated with the gateway module 205 described above. The data reduction process 400 may also be implemented by other in-vehicle components, including, for example, an engine computer. For ease of illustration, however, the process 400 will be described with respect to the gateway module 205.

At block 402, the gateway module 205 gathers in-vehicle data. The in-vehicle data can be received from in-vehicle devices, in-vehicles sensors, the engine computer, or other in-vehicle data sources. The gateway module 205 can receive the data from the various data sources at different frequencies. For example, the engine computer can transmit data to the gateway module every 100 milliseconds, whereas a cargo bay temperature sensor can communicate data every minute.

At block 404, the gateway module 205 processes the in-vehicle data, for example, to reduce a volume of the in-vehicle data. The gateway module 205 can, among other things, analyze, categorize, compress, sample, or process the data. In one embodiment, the gateway module 205 can log some or all of the data received from the data sources and sort the data according to vehicle characteristic. In still other embodiments, the gateway module 205 processes a plurality of data points to produce a value that represents those data points. For instance, the gateway module 205 can compute statistics on the data received from sensors and report the statistics, rather than the data itself, to the vehicle management system 110. As one example, the gateway module 205 could compute the average fuel consumption over the period of one day from frequent fuel data readings from the engine computer. The gateway module 205 can report the processed average fuel consumption value, which may be represented with a few bytes of data or less, instead of reporting the several bytes more of data of the entire fuel readings received from the engine computer.

Other examples of statistics and processing that the gateway module 205 can calculate include data regarding pot holes, including locations or bumps, based on accelerometer data; driver profiles based on such factors as acceleration (including tracking rapid acceleration, hard braking, and excessive acceleration on corners), lane crossings, speed limit violations (including on rough roads, as detected by the accelerometer), and the like. Further, the gateway module 205 can calculate a vehicle sonic profile.

At block 406, the gateway module determines whether to provide updated vehicle data to the vehicle management system 110. The gateway module 205 is generally receiving data relating to each vehicle characteristic at a faster rate than the monitored vehicle characteristic is changing. As such, the gateway module 205 can determine a subset of the total data to send to the vehicle management system 110.

The gateway module 205 can determine for each data characteristic individually whether to provide an update to the vehicle management system. The gateway module 205 can use various methods to determine whether to provide updates, such as periodic updates, threshold-based updates, event-based updates, user-specified updates, and/or a combination of methods as discussed above. Alternatively, the gateway module 205 reports data from some or all sensors at the same rate. If the gateway module 205 determines that an update is to be sent to the vehicle management system, the process continues at block 408. If the gateway module determines that an update does not need to be provided to the vehicle management system, then the process ends and is repeated again when new data is received.

At block 408, the gateway module 205 transmits updated vehicle data to the vehicle management system 110. The updated vehicle data for each data characteristic can be transmitted to the vehicle management system 110 via the radio 240 or another transmission device. In some embodiments, the updated vehicle data can be placed in a queue and updates can be sent to the vehicle management system 110 in periodic updates or larger chunks of data. By preprocessing the vehicle data and sending a subset of information to the vehicle management system 110, the gateway module 205 can reduce redundant processing by the vehicle management system 110, and reduce bandwidth used to transmit all of vehicle data output by the various vehicle data sources. In some embodiments the gateway module 205 can transmit the updated vehicle data and raw vehicle data to the vehicle management system 110. The raw vehicle data can include some or all of the data that the gateway module 205 receives from the sensors and vehicle computer.

Accident Reconstruction

The vehicle management system 110 can also include an accident reconstruction module 170. The accident reconstruction module 170 can be used after a vehicle has been in an accident to reconstruct the accident. The accident reconstruction module 170 can use in-vehicle cameras and sensors to reconstruct the accident. The module 170 can also provide the vehicle management system 110 real-time notifications and remote access to the in-vehicle sensors and equipment. For example, the vehicle can include multiple cameras that capture data during operation, such as a back-up camera, an in-vehicle driver camera (captures drivers actions), a forward facing camera, side-view cameras, and other cameras that capture operation of the vehicle. The cameras and sensors can communicate and/or stream data back to the accident construction module 170 in real-time. The module 170 can also use engine information such as vehicle, speed, acceleration, braking, and other information to help reconstruct the accident.

The module 170 can use data acquired by the vehicle to help reconstruct the accident. The module 170 can analyze segments of time before and after the accident. For example the module 170 can analyze data from one second, five seconds, 30 seconds, or other amount of time before and/or after the accident to help in the reconstruction. The cameras, sensors, and vehicle data, can be used to help determine fault in an accident. For example, the information can be used after the fact to determine who was at fault and analyze liability of the vehicles involved, speeds prior to and during the accidents, and other information that would be useful in determining fault of the involved vehicles. Additionally, a feedback loop can be used to identify risky driving behaviors. For example, in situations where a vehicle rolls over, the information can be used to determine the speed at which the rollover occurred for the type of vehicle involved. The feedback information can be added stored within the vehicle management system.

In other embodiments, the functionality of the accident reconstruction module 170 can be implemented at least in part instead in the onboard vehicle analysis module 160B. As in the audio example above, the onboard vehicle analysis module 160B can process or otherwise diagnose a vehicle problem from the video or camera data and send a representation of this diagnosis to the vehicle management system 110 instead of or in addition to a portion of the video or camera data. Further, the onboard vehicle analysis module 160B can send a snippet of video corresponding to the accident or other detected problem to the vehicle management system 110 instead of a continuous or substantially continuous stream of video. For example, the onboard vehicle analysis module 160B can send a few seconds, a few minutes, or some other time quantity of video data to the vehicle management system 110 before and/or after an accident or other detected problem occurred.

Onboard Vehicle Profiling and Graphical Feedback

The vehicle management system 110 can include an onboard vehicle profiling module 180. The vehicle profiling module 180 can analyze data on a consistent basis in order to identify risky driving behaviors, like heavy breaking and acceleration, average maximum speeds and so forth. A vehicle can include an attached display that provides a driver indications related to driver safety, how well driving, fuel efficiency, idle times. The driver dashboard can show a plurality of different outputs relating to driver safety, work efficiency, carbon Impact, fuel efficiency, idle time, electric and alternate fuel source vehicle performance, traffic, weather, vehicle skills, and other custom navigation options. The driver display can include a display including customized outputs based on efficiency factors, company policy, customer satisfaction, approved fueling locations, and other outputs.

A work efficiency indicator can show the planned work versus the actual performance of work for a specified time period. This indicator can be used to show the productivity of a driver. Productivity can be measured because a driver's schedule can be planned prior to departure. The plan can include the number of stops that the driver is scheduled to perform, the duration of each stop, travel time between stops, and other efficiency parameters. The actual amount of the time that the driver takes to perform each task can be recorded and compared to the scheduled performance of the task. This performance can be monitored continually, at scheduled intervals, or other monitoring protocol. The indicator can provide the driver with feedback of whether the driver is performing the scheduled tasks in the scheduled timeframes.

Intelligent Navigation

The mapping module 115 of the vehicle management system 110 can include intelligent navigation functionality. The intelligent navigation functionality can be used to determine the availability of fueling stations for the vehicle. The module 115 can take into account company agreements with fueling stations, preferred fueling stations, range of the vehicle, type and availability of fuel, the type and connector for electric vehicles (for example, fast charge, slow charge, inductive charge, etc.), and other factors. For electric vehicles, the availability of fueling stations can be affected by weather-based effects. For example, an electric vehicle cannot use an inductive charging station when it is raining.

The module 115 can analyze the available fuel stations based upon the vehicle restrictions and capabilities. For example, an electric vehicle may only be compatible with a subset of the available electric vehicle charging stations. The information can be used to determine an appropriate route for the vehicle to a fueling station with the appropriate fueling resources. For alternate fuel vehicles, the module 115 can factor in the range of the vehicle. The computation for range can include information such as traffic and weather. The route can be updated to take into account the real-time availability of the availability of the resource. For example, an inductive charging station may no longer be available if it starts raining. The module can include hours of operation and the availability of other retail services provided by the fueling stations.

Example Vehicle Management System

As described above, FIG. 1 illustrates an embodiment of a computing environment 100 for implementing a vehicle management system 110 that can implement any of the features described herein, including the enclosed Appendix.

In the computing environment 100, one or more in-vehicle devices 105A . . . 105N and management devices 135 communicate with the vehicle management system 110 over a network 145. The in-vehicle devices 105 can include computing devices installed in fleet vehicles. These devices 105 can include navigation functionality, routing functionality, and the like. The in-vehicle devices 105 can receive route information and other information from the vehicle management system 110. In addition, the in-vehicle devices 105 can report information to the vehicle management system 110, such as driver location, vehicle sensor data, vehicle status (for example, maintenance, tire pressure, or the like), and so forth.

The management devices 135 can be computing devices used by dispatchers, fleet managers, administrators, or other users to manage different aspects of the vehicle management system 110. For example, a user of a management device 135 can access the vehicle management system 110 to generate routes, dispatch vehicles and drivers, and perform other individual vehicle or fleet management functions. With the management devices 135, users can access and monitor vehicle information obtained from one or more of the in-vehicle devices 105 by the vehicle management system 110. Such vehicle status information can include data on vehicle routes used, stops, speed, vehicle feature usage (such as power takeoff device usage), driver behavior and performance, vehicle emissions, vehicle maintenance, energy usage, and the like. In some embodiments, the management devices 135 are in fixed locations, such as at a dispatch center. The management devices 135 can also be used by administrators in the field, and may include mobile devices, laptops, tablets, smartphones, personal digital assistants (PDAs), desktops, or the like.

The vehicle management system 110 can be implemented by one or more physical computing devices, such as servers. These servers can be physically co-located or can be geographically separate, for example, in different data centers. In one embodiment, the vehicle management system 110 is implemented as a cloud computing application. For instance, the vehicle management system 110 can be a cloud-implemented platform hosted in one or more virtual servers and/or physical servers accessible to users over the Internet or other network 145. In the depicted embodiment, the vehicle management system 110 includes a fleet management module 112, a mapping module 115, a telematics module 120, a routing module 130, a dispatch module 140, and an integration module 150. These components can, but need not, be integrated together on a common software or hardware platform.

The fleet management module 112 can include functionality for generating, rendering, or otherwise displaying a vehicle management user interface 114. The vehicle management user interface 114 can include a map or list of vehicles that depicts symbols or other data representative of vehicles. As used herein, the terms "output a user interface for presentation to a user," "presenting a user interface to a user," and the like, in addition to having their ordinary meaning, can also mean (among other things) transmitting user interface information over a network, such that a user device can actually display the user interface.

The fleet management module 112 can communicate with the mapping module 115 to obtain mapping data, which the fleet management module 112 can include in the vehicle management user interface 114. The mapping data can be compressed, transmitted, re-rendered, and displayed on the management user interface 114. Other data can also be overlaid to enhance the map and management layout. The mapping module 115 can be a geographic information system (GIS) in one embodiment. The fleet management module 112 can also access the telematics module 120 to obtain vehicle status data for inclusion in vehicle history timelines. The telematics module 120 can provide this vehicle status data based on telematics data obtained from the in-vehicle devices 105N. The telematics data can include such data as location or speed information obtained using GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth).

The routing module 130 can implement any of the routing features described above. In addition, the routing module 130 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. In addition, the routing module 130 can automatically select routes that take into account factors that affect energy usage using the techniques described in U.S. application Ser. No. 12/954,547, filed Nov. 24, 2010, and entitled "Vehicle Route Selection Based on Energy Usage," the disclosure of which is hereby incorporated by reference in its entirety.

The integration module 130 can facilitate integration of the vehicle management system 110 with other systems, such as fuel card systems, payroll systems, supply chain system, insurance systems, and the like. The dispatch module 140 can provide functionality for users of the management devices 135 to assign drivers and vehicles to routes selected by the routing module 130.

Furthermore, although not shown, the vehicle management system 110 may include functionality for disabling an engine remotely to recover a stolen vehicle (as permitted in Europe and some other areas).

The illustrated network 145 may be a LAN, a WAN, the Internet, combinations of the same, or the like. For ease of illustration, the vehicle management system 110 has been depicted as a centralized system. However, in other implementations, at least some of the functionality of the vehicle management system 110 is implemented in other devices. Other possible implementations of the vehicle management system 110 can include many more or fewer components than those shown in FIG. 1.

Additional Embodiments

Although the embodiments described above focus on wireless and wired communication, in some embodiments, the sensors and devices described herein may communicate via infrared, ultrasonic, or optical (visible light) transmission.

Further, the gateway module 205 can be contained on one or more electronic circuit cards with any of the following connectors: RS-232, RS-488, two or four pin wired connectors with various serial interface devices such as SP1, 1Wire, I2C, and Diagnostic Bus OBDII and J xxxx compatible connectors. The connection between the gateway module 205 and the radio 240 can be RS-232, 1Wire, Wireless, or IrDA, among others. The gateway module 205 may be powered from the vehicle battery either directly or indirectly or it may be powered through the wired data link. Alternatively, the gateway module 205 can include standalone batteries as a power source.

In addition to the above, the gateway module 205 can contain inputs that sense ohmic switch closures or logic level changes. The gateway module 205 can also be equipped with outputs that supply on/off signals to lamps or LEDs. The gateway module 205 can be configured in modular form and incorporated on a circuit board with other devices or may be packaged in an enclosure and operated in a standalone configuration. Further, standard electrical interface devices or chips may be used by the wireless data module 340 or another device to condition the various serial link signals to make them compatible with the gateway module 205 (for example, to be compatible with 3.3V, 3.5V, or 5V interfaces).

Moreover, some or all of the functionality of the gateway module 205 may be implemented directly in the wireless data module 340 in some embodiments. For instance, the wireless data module 340 can process at least some of the data received from the vehicle bus to reduce the volume of this data. The wireless data module 340 can send data to the gateway module 205, for instance, when a sensor state changes instead of more frequently. For example, the wireless data module 340 can transmit a door sensor value in response to the door opening or closing, rather than at all times, to the gateway module 205. In another embodiment, the wireless data module 340 provides a first layer of filtering or data reduction, sending a reduced data set to the gateway module 205, and the gateway module 250 performs a further layer of filtering or data reduction prior to sending data to the radio 240 for transmission to the vehicle management system 110.

Figure 5:
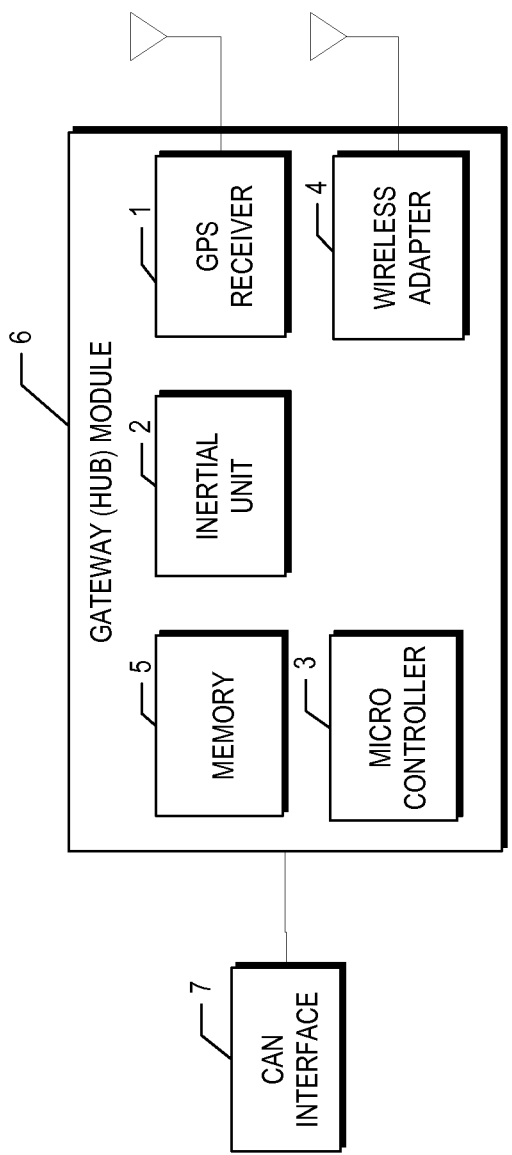
FIG. 5 illustrates an embodiment of a gateway telematics device.

FIG. 5 illustrates an embodiment of a gateway telematics device for continuous position tracking and updating. The telematics device described herein can enable continuous position tracking of a vehicle operating in environments that do not traditionally have radio network or cellular communication, such as a continuum of open space, tunnels, viaducts, shipyards, underground parking, and 'secure' enclosures.

FIG. 5 shows an embodiment of the device which includes an enclosure 6, a GPS receiver 1, an inertial unit 2, a micro controller 3, a wireless radio 4, and a memory unit 5. Some examples of communication paths between the components can include a GPS data link to the microcontroller 8, a data link from the inertial unit 2 to the microcontroller 3, a data link from the microcontroller 3 to the inertial unit 2, and a data path from the microcontroller 3 to the wireless radio 4.

The GPS receiver 1 can provide the calculated position of the vehicle to the microcontroller 3 at calculated intervals. The inertial unit 2 can calculate the position of the vehicle. The data from the GPS receiver 1 is compared with the data obtained from the inertial unit 2. If the GPS data verifies, it is transmitted via the wireless radio 4. The data can be verified if the values are within a given range and the data can be stored in memory 5.

If the value from the GPS unit 1 is not in range, the value from the inertial unit is sent to the microcontroller 3 and to the memory 5. This operation continues as long as the unit is receiving power or is commanded to pause via a signal from the wireless radio 4 or from a CAN Bus signal 7.

The CAN bus signal may be used to modulate a wireless signal which is transmitted. This operation continues as long as the unit has not been caused to pause operation. Note that position may be determined continuously even when the GPS receiver is not operating properly due to signal loss or to malfunction. The wireless radio can transmit data as long as there is a link with a receiver available. In some embodiments, the wireless radio can switch between different modes of communication, such as cellular and WiFi.

Figure 6A:
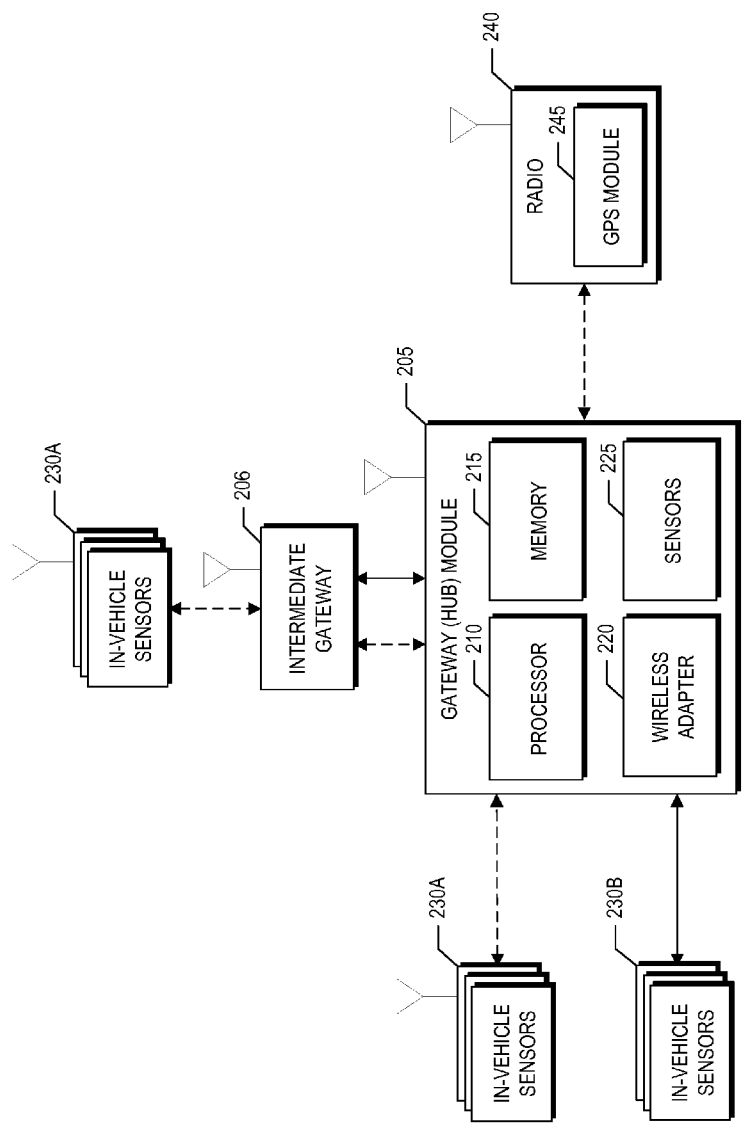
FIG. 6A illustrates another embodiment of a gateway module.

FIG. 6A illustrates another embodiment of a vehicle using a gateway module 205. In this embodiment an intermediate or secondary gateway module 206 can be used for specific types of vehicle assets that can be interchanged with multiple vehicles, such as trailers. The intermediate gateway module 206 can receive communications from sensors that are installed within the specific asset. The intermediate gateway module 206 can pass the data through to the gateway module 205. The intermediate gateway can be in wireless and/or wired communication with the gateway module 205. The intermediate gateway 206 can act as a pass through and may not process the data prior to providing it to the gateway module. In some embodiments, the intermediate gateway 206 can perform some processing and filtering of the data prior to routing the data to the gateway module 205. Thus, for example, a tractor truck may include the gateway 205, and an attached trailer may include the intermediate gateway 206 (or vice versa). Any number of intermediate or secondary gateway modules 206 may be included in a given vehicle, trailer, or asset.

Figure 6B:
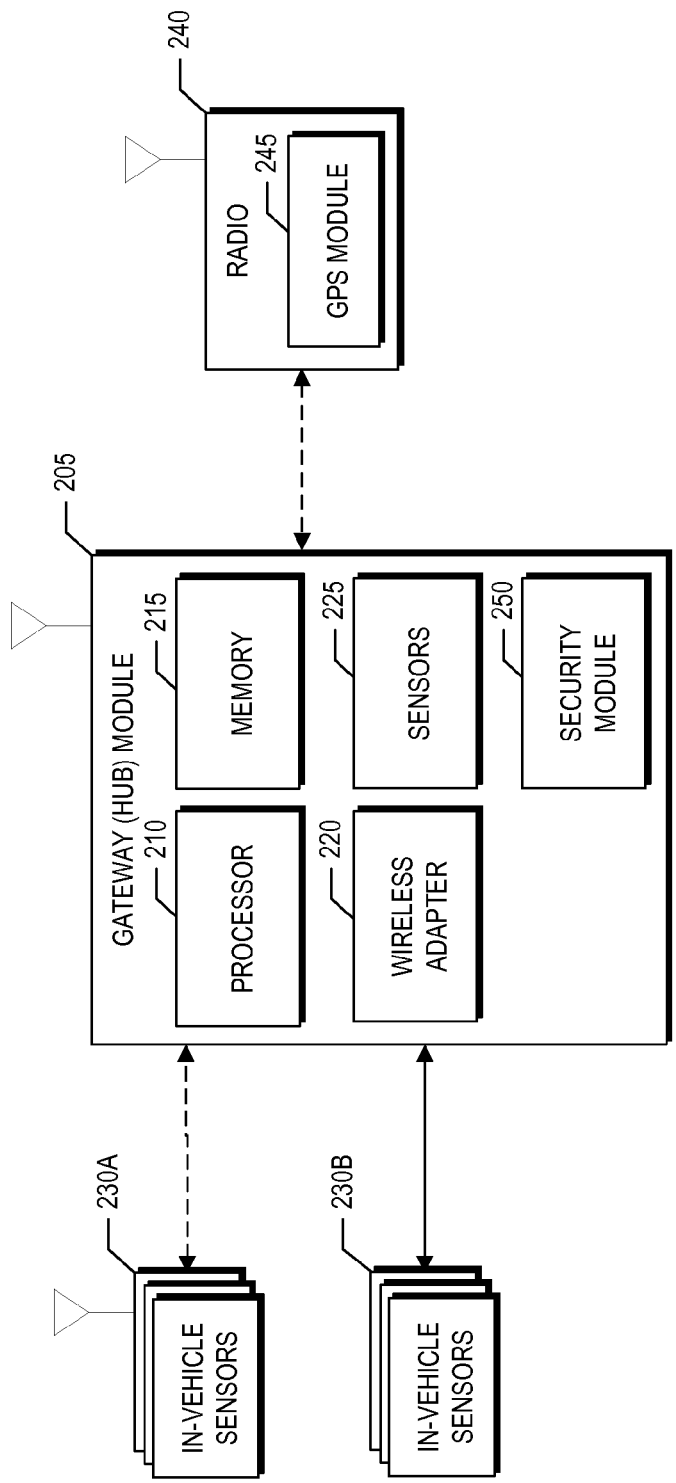
FIG. 6B illustrates yet another embodiment of a gateway module.

FIG. 6B illustrates another embodiment of a vehicle using a gateway module 205. In this embodiment, the gateway module 205 includes a security module 250. The security module 250 can be configured to establish secure communications between the vehicle management system 110 and the gateway module 205. In some embodiments, the security module can include embedded hardware components, such as a trusted platform module. The security module can be used to establish a secure operating environment on the gateway module by verify digital signatures associated with the firmware and/or software operating on the gateway module 205. The verification of the firmware and/or software can be referred to as establishing a root of trust. After the security module establishes a root of trust, the security module can be configured to provide authentication to the vehicle management system to establish that the gateway module is operating in a secure environment.

Remote Vehicle Prognostic Embodiments

The disclosure also provides embodiments of a system for remote vehicle prognostics. The system can include any features of the systems and methods described above, and may be used in conjunction therewith, or with any subset of the features thereof. The system can use vehicle data for real-time pattern recognition. The vehicle data can include in-vehicle data and other vehicle data accessed over a network. The system can compare a single vehicle's data against other like vehicles to determine exceptional condition, behaviors, and potential failures. A system running remote vehicle prognostics to collect data at a configurable rate (such as 1 Hz) could monitor for out-of-threshold conditions to determine exceptional events based on patterns that match. Vehicles equipped with a remote vehicle prognostics system could provide data to network-based data repository of "community" data that could help supplement the external data pattern recognition.

The system can utilize external and vehicle profile data sources to compare against vehicle data. The external data can include databases with OEM/factory (or other derivative) vehicle specifications and operating thresholds. The external data can also include vehicle profile data from vehicles that participate in the RVP community would supplement external data sources.

Vehicle profile data could include historical data of operating thresholds deemed normal. Environmental data could also be applied to determine like conditions of vehicles and provide further context of recognized patterns. Combined data could relate to potential failure based on like-vehicle configurations and information which led up to breakdown events, safety concerns. For example, based on a pattern identified for starter seizures, the remote vehicle prognostics could look for operating and environmental conditions that matched a pattern. An exemplary pattern be: Engine hours (X)+Starter Cycles (Y)+Environment (outdoor) Temp(Z)= Potential for Starter Failure/Cease.

The areas to be addressed include Mechanical, Maintenance, Environmental, and Safety Profiles. Each profile could be compared against external data, self-profile, and could have a custom profile applied (like a Police Dept). If there is a pattern recognized, alerting processes could trigger based upon established, configured, and defined methods. Alert to driver/operator could occur and alerts to network-based applications could also be available.

The Mechanical profile (for example, DTC, MIL Status, etc.) could look for patterns of operating vehicle with like vehicle configurations to determine likelihood of failures. The available data sources could include external sources, such as OEM specifications/thresholds, mechanical breakdown info (Year, Make, Model, Engine, Trans, Powertrain details, Engine Hours, Odometer, etc.). Vehicles equipped with remote vehicle prognostics could provide additional detail to supplement the "community" data and add to pattern recognition. A vehicle can provide self-profiling information that would also be used to identify operating characteristics outside of defined ranges to alert on potential break downs.

The Maintenance profile relates to oil changes, tire balance/repair, tune up/overhaul, etc. The Maintenance profile could schedule maintenance needs and telematic conditional items that could advance maintenance requirements. The Maintenance profile could use real time engine data. Additionally, preventative maintenance schedules and alerts could be provided to the operator and the network based system. The available data sources could include external sources, such as OEM specifications. Vehicles equipped with remote vehicle prognostics could provide additional detail to supplement the "community" data and add to pattern recognition. A vehicle can provide self-profiling information that would also be used to identify operating characteristics outside of defined ranges to provide alerts for the maintenance profile.

The environmental profile relates to providing information about environmental conditions, such as driving in rain, snow, ice, and operational characteristics associated with the conditions, such as excess speed, traction control system is disabled, etc. Combined conditions could be analyzed to provide real time indicators to operators (and back to the network-based system) of unsafe operation. Combined conditions could also be applied to the Mechanical, Maintenance and Safety profiles as a factor in pattern identification. Data sources can include external data (weather, road, etc.), vehicle engine data, and additional on-vehicle sensors.

The Safety profile relates to reconstructing events leading up to accident events and providing alerts ahead of potential events based on vehicle operating capabilities. The accident reconstruction can record numerous vehicle safety data elements. The defined data points can be captured at a high frequency. The data points can include, but not limited to, Brake Status (Master Cylinder, Brake Pad Sensors, etc.), Brake Position, Accelerator Position, Engine RPM, TCS/ABS Events, Steering Wheel Position, Speed, Transmission Position, Airbag Status, etc. Data captured at individual vehicle levels could be transmitted to the cloud for community processing and trend analysis. The data sources can include vehicle engine data (some or all protocols), additional on-vehicle sensors as equipped, external data, such as environmental data. The Safety profile can also alert driver (and network-based system) of potential operating conditions that exceed defined thresholds and could lead to an uncontrollable vehicle.

Terminology

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithm). Moreover, in certain embodiments, acts or events can be performed concurrently, for example, through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "for example," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A black-box gateway device implemented in a vehicle and configured to interface with an engine computer, a plurality of cameras, and a plurality of wireless sensors installed in the vehicle, the gateway device comprising:
    a transceiver comprising:
        input ports in communication with conductors that interface with the engine computer installed in an engine of the vehicle;
        radio frequency communications components comprising dual wireless functionality, including a first functionality for communicating wirelessly within the vehicle and a second functionality for communicating wirelessly over a cellular network disposed outside the vehicle; and
        one or more antennae that receive wireless signals from the radio frequency components;
        the transceiver configured to wirelessly receive sensor data from the plurality of wireless sensors and receive audio-video data from the plurality of cameras disposed within the vehicle, the sensor data and the audio-video data providing information associated with functionality of components of the vehicle;
    digital logic circuitry programmed with executable instructions that configure the digital logic circuitry to:
        identify one of the wireless sensors associated with the received sensor data;
        determine whether to transfer the sensor data over the cellular network to a remote vehicle management system based, at least in part, on a comparison of the sensor data to a threshold associated with the identified sensor;
        based on a determination that the sensor data satisfies the threshold, transmit at least a portion of the sensor data to the remote vehicle management system;
        modify the threshold associated with the identified sensor in order to increase the frequency at which the digital logic circuitry provides the sensor data associated with the identified sensor to the remote vehicle management system;
        determine a severity level of a failure event associated with the sensor data that satisfied the threshold;
        determine whether to transmit the audio-video data over the cellular network to the remote vehicle management system based on a type of the failure event;
        based on a determination to transmit the audio-video data, transmit at least a portion of the audio-video data at first intervals to the remote vehicle management system;
        modify the first intervals based, at least in part on the severity level of the failure event;
        analyze the sensor data and audio-video data to calculate driver profile related data based on factors comprising acceleration, braking, lane crossings and speed;
        identify driving behaviors from the driver profile related data;
        determine an output action based, at least in part, on the severity level of the failure event and the audio-video data; and
        generate instructions based on the output action to output information associated with the failure event and the driving behaviors to a computing device associated with a vehicle operator.

2. The gateway device of claim 1 wherein identification of the sensor is based, at least in part, on header information received with the sensor data.

3. The gateway device of claim 1, wherein the sensor data comprises at least one of a sensor identity, a location of the sensor, or a type of sensor data.

4. The gateway device of claim 1, wherein the digital logic circuitry is further configured to determine whether to transfer the sensor data by comparing the received sensor data to previous sensor data.

5. The gateway device of claim 4, wherein the digital logic circuitry is further configured to determine whether to transfer the sensor data to the remote vehicle management system based, at least in part, on a determination that a difference between between the received sensor data and the previous sensor data satisfies a change threshold.

6. The gateway device of claim 1, wherein the threshold is a time-based threshold, wherein the time-based threshold is satisfied based, at least in part, on when a defined period of time has elapsed since transmission of previous sensor data.

7. The gateway device of claim 1, wherein the transceiver is configured to receive the sensor data at periodic second intervals.

8. The gateway device of claim 7, wherein the digital logic circuitry is further configured to filter the sensor data received from the sensor to remove entries where a designated portion of the sensor data is the same.

9. The gateway device of claim 1, further comprising a gateway module that is configured to receive vehicle data from a vehicle bus and transmit at least a portion of the vehicle data to the remote vehicle management system.

10. The gateway device of claim 9, wherein the vehicle bus is a Controller Area Network (CAN) bus.

11. A computer system implemented in a vehicle and configured to interface with an engine computer, a plurality of cameras, and a plurality of wireless sensors installed in the vehicle, the computer system comprising:
    digital logic circuitry programmed with executable instructions that configure the digital logic circuitry to:
        receive a plurality of transmissions comprising sensor data from the plurality of wireless sensors and audio-video data from the plurality of cameras disposed within a vehicle;
        filter the plurality of transmissions of sensor data to remove transmissions where at least a portion of the sensor data received from the plurality of transmissions is the same;

compare the filtered sensor data to previous sensor data received from the sensor;

based on a determination that a difference between the filtered sensor data and the previous sensor data exceeds a determined threshold associated with the sensor data, transmit at least a portion of the sensor data to a remote vehicle management system;

modify the threshold associated with an identified sensor in order to increase the frequency at which the digital logic circuitry provides the sensor data associated with the identified sensor to the remote vehicle management system;

determine a severity level of a failure event associated with the filtered sensor data that satisfied the threshold;

determine whether to transmit the audio-video data over a cellular network to the remote vehicle management system based on a type of the failure event;

based on a determination to transmit the audio-video data, transmit at least a portion of the audio-video data at first intervals to the remote vehicle management system;

modify the first intervals based, at least in part on the severity level of the failure event;

analyze the sensor data and audio-video data to calculate driver profile related data based on factors comprising acceleration, braking, lane crossings and speed;

identify driving behaviors from the driver profile related data;

determine an output action based, at least in part, on the severity level of the failure event and the audio-video data; and generate instructions based on the output action to output information associated with the failure event and the driving behaviors to a computing device associated with a vehicle operator.

12. The computer system of claim 11, wherein the digital logic circuitry is further configured to receive the plurality of transmissions from the sensor comprising the same sensor data.

13. The computer system of claim 11, wherein the sensor data comprises identification information identifying the sensor within the vehicle.

14. The computer system of claim 11 wherein the digital logic circuitry is further configured to receive sensor data from the plurality of wireless sensors disposed within the vehicle.

15. A method for interfacing with an engine computer, a plurality of cameras, and a plurality of wireless sensors installed in a vehicle, the method comprising:

receiving wirelessly, by a hub device, sensor data from a plurality of wireless sensors and audio-video data from the plurality of cameras disposed within a vehicle, wherein the sensor data and the audio-video data provide information associated with a component of the vehicle;

filtering a plurality of transmissions of sensor data to remove transmissions where at least a portion of the sensor data received from the plurality of transmissions is the same;

processing, by the hub device, the sensor data to determine whether to transfer the sensor data to a remote vehicle management system; and based on a determination to transfer the sensor data to the remote vehicle management system, transmitting at least a portion of the sensor data to the remote vehicle management system;

modifying a threshold associated with an identified sensor in order to increase the frequency at which the hub device provides the sensor data associated with the identified sensor to the remote vehicle management system;

determining a severity level of a failure event associated with the sensor data that satisfied the threshold;

determining whether to transmit the audio-video data over the cellular network to the remote vehicle management system based on a type of the failure event;

based on a determination to transmit the audio-video data, transmitting at least a portion of the audio-video data at first intervals to the remote vehicle management system;

modifying the first intervals based, at least in part on the severity level of the failure event;

analyzing the sensor data and audio-video data to calculate driver profile related data based on factors comprising acceleration, braking, lane crossings and speed;

identifying driving behaviors from the driver profile relate data;

determining an output action based, at least in part, on the severity level of the failure event and the audio-video data; and generating instructions based on the output action to output information associated with the failure event and the driving behaviors to a computing device associated with a vehicle operator.

16. The method of claim 15, wherein the processing includes comparing the sensor data to previous sensor data to determine whether the previous sensor data is different from the sensor data.

17. The method of claim 15, wherein receiving the sensor data includes receiving the plurality of transmissions from the sensor comprising the same sensor data.

18. The method of claim 17, wherein processing includes filtering the plurality of transmissions from the sensor to remove entries where a designated portion of the sensor data is the same.

19. The method of claim 15, wherein the sensor data comprises identification information identifying the sensor within the vehicle.

* * * * *